United States Patent
Venkata et al.

(10) Patent No.: US 10,484,358 B2
(45) Date of Patent: Nov. 19, 2019

(54) SINGLE SIGN-ON USER INTERFACE IMPROVEMENTS

(71) Applicant: ServiceNow, Inc., Santa Clara, CA (US)

(72) Inventors: Subbaaraya Kumar Deverakonda Venkata, Milpitas, CA (US); Sanjay Shrikanth Kittur, San Jose, CA (US); Kai Xu, San Jose, CA (US); Ashok Ganesan, Milpitas, CA (US); Wallace Peng, Santa Clara, CA (US)

(73) Assignee: ServiceNow, Inc., Santa Clara, CA (US)

(*) Notice: Subject to any disclaimer, the term of this patent is extended or adjusted under 35 U.S.C. 154(b) by 131 days.

(21) Appl. No.: 15/588,107

(22) Filed: May 5, 2017

(65) Prior Publication Data
US 2018/0324174 A1    Nov. 8, 2018

(51) Int. Cl.
*H04L 29/06* (2006.01)
*H04W 12/06* (2009.01)

(52) U.S. Cl.
CPC ...... *H04L 63/0815* (2013.01); *H04L 63/0823* (2013.01); *H04W 12/06* (2013.01)

(58) Field of Classification Search
CPC .. H04L 63/0815; H04L 63/0823; H04L 12/06
See application file for complete search history.

(56) References Cited

U.S. PATENT DOCUMENTS

| | | | |
|---|---|---|---|
| 7,016,875 B1* | 3/2006 | Steele | G06Q 10/00 705/44 |
| 2005/0154913 A1* | 7/2005 | Barriga | G06F 21/33 726/4 |
| 2006/0236382 A1* | 10/2006 | Hinton | G06F 21/41 726/8 |
| 2009/0089625 A1* | 4/2009 | Kannappan | G06Q 10/10 714/39 |
| 2009/0119763 A1* | 5/2009 | Park | H04L 63/0815 726/8 |
| 2009/0249440 A1* | 10/2009 | Platt | H04L 63/0815 726/1 |
| 2009/0292927 A1* | 11/2009 | Wenzel | G06F 21/41 713/185 |

(Continued)

OTHER PUBLICATIONS

ServiceNow, ServiceNow Documentation (Discover an Amazon Web Services (AWS) cloud), Feb. 20, 2017 (downloaded from public web site http://docs.servicenow.com).

(Continued)

*Primary Examiner* — Sher A Khan
(74) *Attorney, Agent, or Firm* — Fletcher Yoder PC

(57) ABSTRACT

Improving a security configuration may include receiving a request to assign a single sign-on configuration for a user profile, present a user interface comprising input fields for configuration characteristics, receiving an indication from the user interface that an administrator is requesting the assign the configuration characteristics, in response to receiving the indication, performing a test connection using the configuration profile, and in response to determining that the test connection succeeded, prompting the administrator to activate the single sign-on communication for the user profile.

14 Claims, 6 Drawing Sheets

(56) References Cited

U.S. PATENT DOCUMENTS

| | | | | |
|---|---|---|---|---|
| 2012/0079577 A1* | 3/2012 | Hao | ............ | H04L 63/10 |
| | | | | 726/7 |
| 2012/0210413 A1* | 8/2012 | Akula | ............ | H04L 63/0815 |
| | | | | 726/8 |
| 2013/0086669 A1* | 4/2013 | Sondhi | ............ | G06F 21/41 |
| | | | | 726/8 |
| 2013/0198801 A1* | 8/2013 | Nishizawa | ............ | H04L 29/06768 |
| | | | | 726/1 |
| 2014/0165150 A1* | 6/2014 | Brunswig | ............ | G06F 21/41 |
| | | | | 726/4 |
| 2014/0310792 A1* | 10/2014 | Hyland | ............ | H04L 63/0861 |
| | | | | 726/8 |
| 2015/0254450 A1* | 9/2015 | Ravi | ............ | G06F 21/41 |
| | | | | 726/8 |
| 2015/0319156 A1* | 11/2015 | Guccione | ............ | H04L 63/08 |
| | | | | 726/7 |
| 2016/0285858 A1* | 9/2016 | Li | ............ | H04L 63/0815 |

OTHER PUBLICATIONS

ServiceNow, Cloud Management product overview, Feb. 20, 2017 (downloaded from public web site http://docs.servicenow.com).

ServiceNow, Device Classifications, Feb. 1, 2017 (downloaded from public web site http://wiki.servicenow.com).

ServiceNow, Discovery Agentless Architecture, Feb. 1, 2017 (downloaded from public web site http://wiki.servicenow.com).

ServiceNow, ServiceNow Documentation (Data collected by discovery), Feb. 20, 2017 (downloaded from public web site http://docs.servicenow.com).

ServiceNow, ServiceNow Documentation (Discovery for VMware), Feb. 21, 2017 (downloaded from public web site http://docs.servicenow.com).

* cited by examiner

SINGLE SIGN-ON USER INTERFACE IMPROVEMENTS

TECHNICAL FIELD

Embodiments described herein generally relate to computing and in particular disclosed embodiments for utilizing a test connection for generating a single sign-on configuration profile for a user, and automatically retrieving and updating certificates for a single sign-on configuration.

BACKGROUND

Cloud computing relates to the sharing of computing resources that are generally accessed via the Internet. In particular, cloud computing infrastructure allows users to access a shared pool of computing resources, such as servers, storage devices, networks, applications, and/or other computing based services. By doing so, users, such as individuals and/or enterprises, are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud based developmental platform for users to develop, modify, and/or customize applications and/or automating business operations without maintaining network infrastructure and/or allocating computing resources normally associated with these functions.

Within the context of automating business, IT, and/or other organization-related functions (e.g., incident tracking (help desk)), PaaS often provides users an array of tools to implement complex behaviors, such as rules, scheduled jobs, events, and scripts, to build automated processes and to integrate with third party systems. Among these functions is providing the ability to provide single sign-on authentication to a particular user. One example of a protocol that may be used for providing single sign-on is security assertion markup language (SAML). SAML is a protocol that uses security tokens containing assertions to pass information about a user between a SAML authority and a service provider. An administrator may set up a single sign-on profile for a particular user, but often issues with the profile are not caught until the user attempts to utilize the single sign-on profile. Further, an administrator may set up a single sign-on profile to utilize a particular certificate, but the certificate is often managed by another party. Thus, the certificate may become obsolete, for example when a new version of the certificate is released rendering the single sign-on profile inoperable.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method for improving a security configuration is described. The method may include receiving a request to assign a single sign-on configuration for a user profile, present a user interface comprising input fields for configuration characteristics, receiving an indication from the user interface that an administrator is requesting the assign the configuration characteristics, in response to receiving the indication, performing a test connection using the configuration profile, and in response to determining that the test connection succeeded, prompting the administrator to activate the single sign-on communication for the user profile.

In another embodiment, the method may be embodied in computer executable program code and stored in a non-transitory storage device. In yet another embodiment, the method may be implemented in a network system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
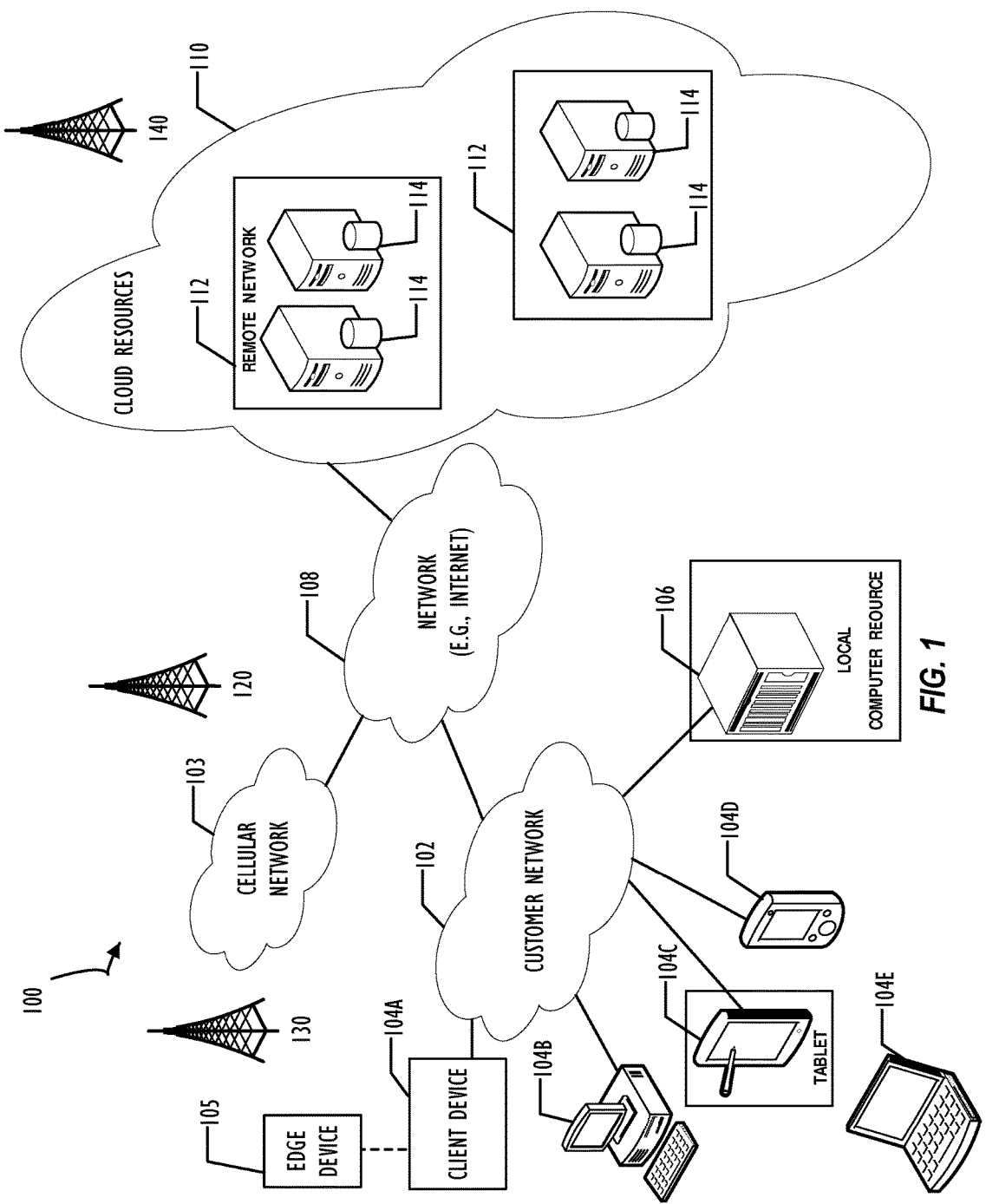
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Various example embodiments are disclosed herein that allow an administrator or other entity to generate single sign-on profiles for users. In one or more embodiments, the administrator may enter the configuration information for a user into a user interface. The user interface may include a number of fields that correspond to various configuration characteristics. When the user is done entering the configuration data, the user may request to assign the configuration characteristics to the user. In response to receiving the request, the system may mandate a test connection, according to one or more embodiments. For example, the system may either perform a test connection for the user using the configuration characteristics, or may determine that a test connection has previously been successful for the configuration characteristics. In response to determining that the test connection has succeeded, then the system may deploy and activate the configuration characteristics for the user. That is, until the system determines by a test connection that the configuration characteristics will work, then the system does not allow the configuration characteristics to be deployed and activated. Thus, any previous single sign-on profile for the user will remain in place until it is determined that the new profile will be operable.

In one or more embodiments, single sign-on profiles for users may utilize one or more certificates, which may be issued by an issuing authority. If one or more profiles managed by the system utilize a particular certificate, then the system may subscribe or otherwise monitor the issuing authority to determine whether any updated versions of the certificate have been released. If it is determined that an updated version of a certificate already in use has been released, then the new certificate may be retrieved and stored. In one or more embodiments, profiles using that certificate may be modified to include the updated certificate as an additional or alternative certificate.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks (Wi-Fi is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 includes a local compute resource 106 that may include a server, access point, router, or other device configured to provide for local computational resources and/or facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a first customer instance is configured as a partner instance "P-instance" and a second customer instance is configured as a "C-instance," where the C-instance is for a customer instance utilizing an application service from the cloud service provider (e.g., SaaS). One difference between the P-instance and the C-instance, in this embodiment, is that the P-instance includes an Application Generator application as disclosed herein. The Application Generator application can assist the "partner" to create augmented applications for use in one or more traditional C-instances. That is, the partner utilizes their P-instance to create additional software offerings for customers of the cloud service provider via an application store facility of the cloud service provider. These additional software offerings may be in the form of integration applications that allow different application suites or functions to interact with each other. Details of this will be discussed below with reference to FIGS. 3-5.

Figure 2:
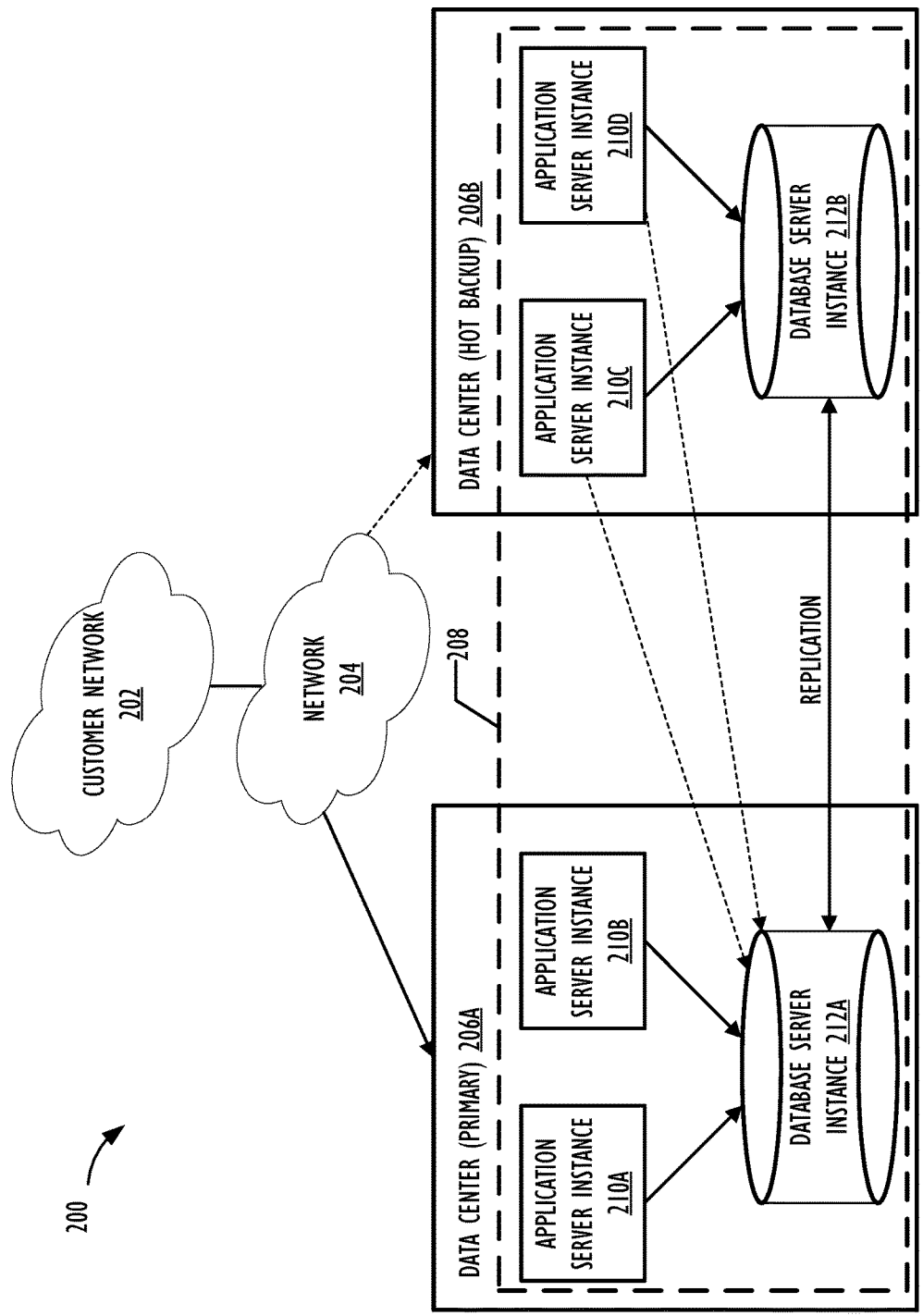
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within cloud resources platform/network 110. Using FIG. 2 as an example, a customer instance 208 is composed of four dedicated application server instances 210a-210d and two dedicated database server instances 212a and 212b. Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, application server instances 210a-210d and database server instances 212a and 212b are shown to be allocated to two different data centers 206a and 206b, where one of data centers 206 may act as a backup data center. In reference to FIG. 2, data center 206a acts as a primary data center that includes a primary pair of application server instances 210a and 210b and primary database server instance 212a for customer instance 208, and data center 206b acts as a secondary data center to back up primary data center 206a for a customer instance 208. To back up primary data center 206a for customer instance 208, secondary data center 206 includes a secondary pair of application server instances 210c and 210d and a secondary database server instance 212b. Primary database server instance 212a is able to replicate data to secondary database server instance 212b. As shown in FIG. 2, primary database server instance 212a replicates data to secondary database server instance 212b using a replication operation such as, for example, a Master-Master MySQL Binlog replication operation. The replication of data between data centers could be implemented in real time or by implementing full backup weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if application server instances 210a and 210b and/or primary data server instance 212a fails and/or is under maintenance, data traffic for customer instances 208 can be diverted to secondary application server instances 210c and 210d and secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only examples to facilitate ease of description and explanation.

Figure 3:
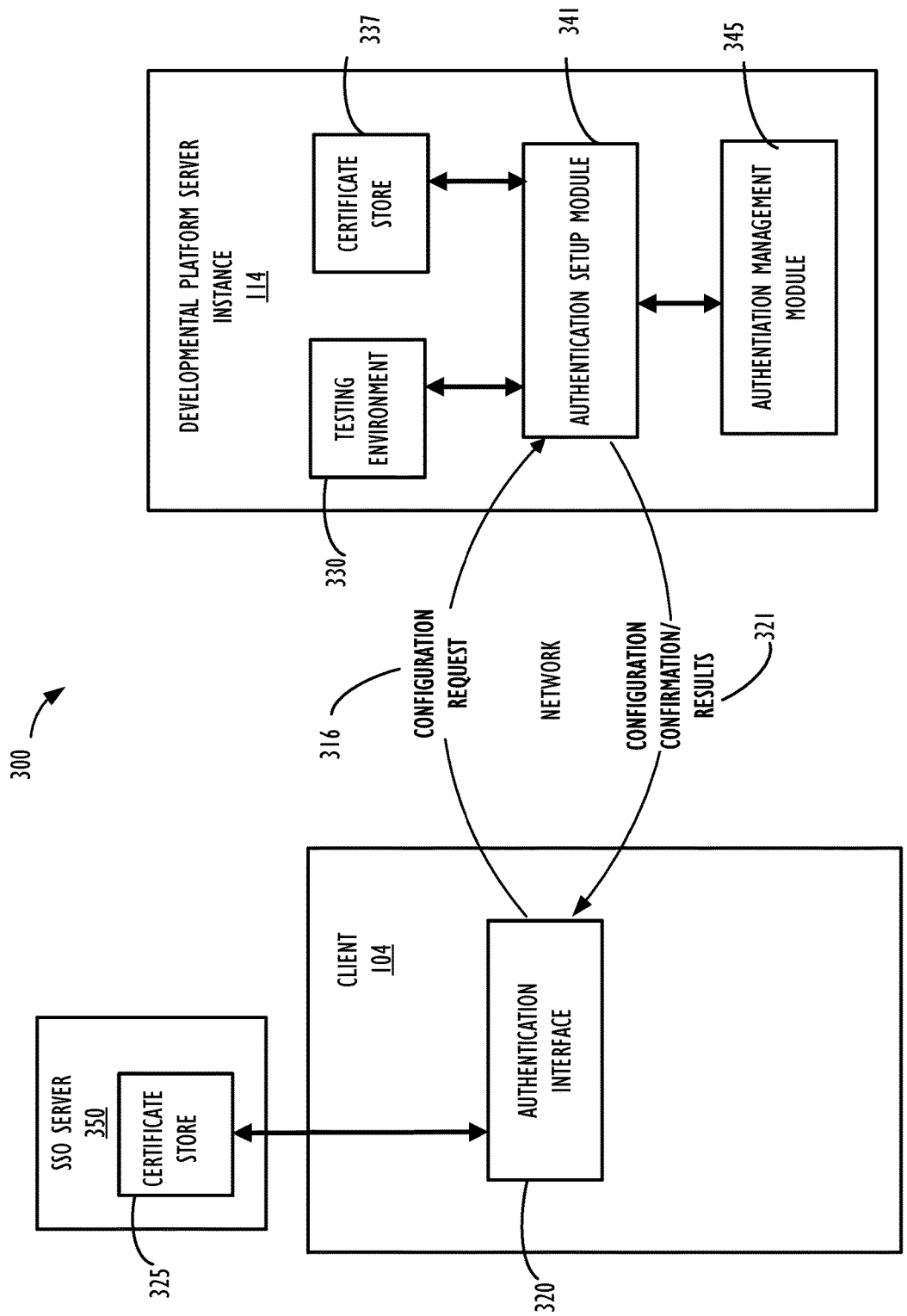
FIG. 3 illustrates a block diagram 300 of an embodiment of a network environment that may be utilized to generate single sign-on profiles for users, according to one or more embodiments.

FIG. 3 illustrates a block diagram 300 of an embodiment of a network environment that may be utilized to generate single sign-on profiles for users, according to one or more embodiments. Specifically, block diagram 300 depicts a client 104 interacting with a developmental platform server instance 114 to provide authentication in the form of a single sign-on profile for a user. Client 104 may be any kind of client computing device. Developmental platform server instance 114, as described above, may be a single server instance utilized by a customer to manage workflows and operations.

According to one or more embodiments, an administrator may set up a user profile for single sign-in through a client device 104. Specifically, in one or more embodiments, the administrator may sign in through authentication interface 320 of a client device 104. In one or more embodiments, the administrator may send a configuration request 316 from the authentication interface to an authentication setup module 341 in the developmental platform server instance 114. The administrator may also receive configuration confirmations 321 and other transmissions from the authentication setup module 341.

The authentication interface 320 may provide a user interface in which an administrator may set up single sign-on authentication for a user. In one or more embodiments, the user interface may include a set of fields corresponding to configuration characteristics for a single sign-on profile for a user. In one or more embodiments, the configuration characteristics may include an indication of an identity provider, data regarding the identity provider, user information, certificate information, and the like.

According to one or more embodiments, the administrator may submit the certificate from client device 104 for a particular user profile. In one or more embodiments, the certificate may be retrieved by the authentication interface 320 from a certificate store 325. Certificate store 325 may be part of a single sign-on server 350, for which client device 104 may be connected across network 100. Certificate store 325 may contain certificates that are utilized by the authentication interface 320 and the authentication setup module 341. Single sign-on server 350 may correspond to an issuing entity such as an identity provider, which generates and manages certificates for single sign-on configurations. In one or more embodiments, single sign-on server 350 may manage security assertion markup language (SAML) certificates.

In one or more embodiments, developmental platform server instance 114 may include an authentication setup module 341. The authentication setup module 341 may provide functionality to setup security operations, such as external authentication, or single sign-in authentication. According to one or more embodiments, single sign-on authentication may be a method of access control that enables a user to log in once and gain access to the resources of multiple software systems without being prompted for a login. Single sign-on may allow end users login to portal pages without having to re-enter authentication information.

Authentication setup module 341 may interface with a testing environment 330. According to one or more embodiments, an administrator may send configuration characteristics for a particular user profile through authentication interface 320. The configuration characteristics may be received by authentication setup module 341, which may set up the security configuration. In one or more embodiments, the authentication setup module 341 may utilize the testing environment 330 to test connection information based on the configuration characteristics received with the configuration request 316. The testing environment 330 may include a memory partition that is intended to temporarily store the configuration characteristics during a testing phase such that the configuration characteristics are not activated until they are tested successfully. The testing environment 330 may run a test connection based on the received configuration characteristics. If the test connection is successful, then the authentication setup module 341 may pass on the configuration characteristics to the authentication management module 345, which may activate the single sign-on profile for the use based on the configuration characteristics. In addition, if the test connection is successful, then the configuration characteristics may be stored somewhere more long-term, such as a storage associated with authentication management module 345.

According to one or more embodiments, if the test connection executed by testing environment 330 is unsuccessful, then instead of the configuration confirmation 321, a results page may be transmitted to the authentication interface 320 for presentation to the administrator. In one or more embodiments, the result page may indicate whether one or more of the configuration characteristics were successful. According to one or more embodiments, the results page may be generated and transmitted to the authentication interface 320 whether or not the test connection is successful. That is, if the test connection is successful, then a results page may be transmitted that indicates that one or more of the configuration characteristics was successful. In the situation where the test connection is unsuccessful, the result page may indicate to the administrator which configuration characteristic is causing the test connection to fail. Thus, in response to receiving an indication of the failed test connection, the authentication interface 320 may prompt the administrator to modify the configuration characteristics before sending an updated configuration request. In one or more embodiments, the authentication setup module 341 may require a successful test connection prior to allowing the activation of the single sign-on profile for the user based on the configuration characteristics.

As depicted, developmental platform server instance 114 may include a certificate store 337. In one or more embodiments, the certificate received from the authentication interface as part of the configuration request 316 may be stored in certificate store 337. Further, in one or more embodiments, certificate store 337 may manage all certificates utilized by user profiles managed by the authentication interface 320, or other instances of an authentication interface that may be located among the network 100. In addition, the authentication setup module 341 may monitor the sources of the certificates stored in the certificate store 337 in order to obtain updated certificates when they are available. According to one or more embodiments, issuers of certificates may make their certificates publicly available. Thus, authentication setup module 341 may occasionally or periodically poll certificate issuers to determine whether any updates to certificates stored in certificate store 337. Further, in one or more embodiments, when an updated certificate is obtained, then single sign-on profiles that utilize the original certificate may be updated to include the updated certificate. That is, the original certificate may be replaced or supplemented with the updated certificate.

Figure 4:
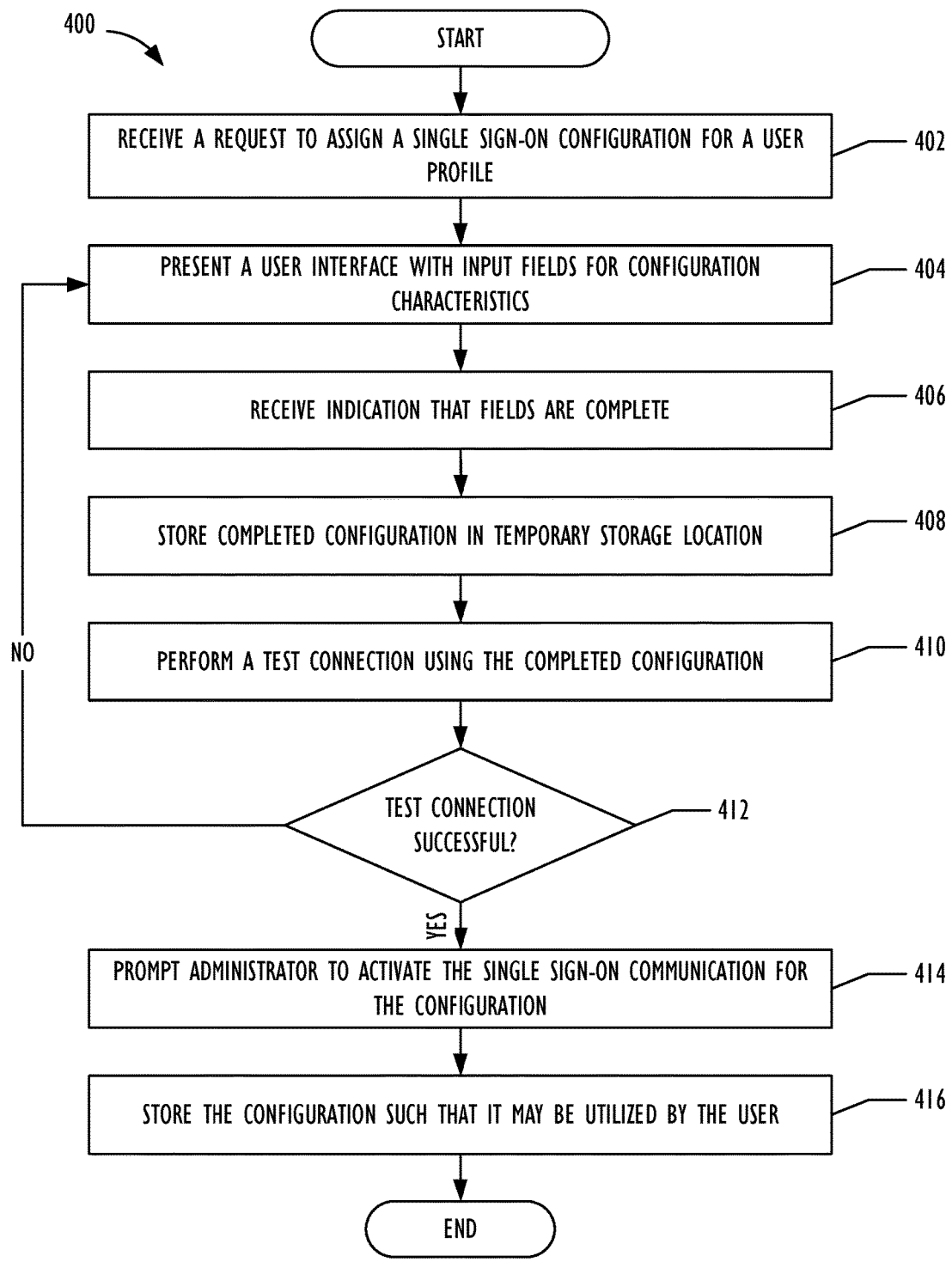
FIG. 4 illustrates a flowchart 400 of an embodiment to generate single sign-on profiles for users, according to one or more embodiments.

FIG. 4 illustrates a flowchart 400 of an embodiment to generate single sign-on profiles for users, according to one or more embodiments. In one or more embodiment, the flowchart 400 is directed to an administrator utilizing the system to generate a single sign-on profile for a user. For purposes of clarity, the various actions will be described with respect to the various components of FIG. 3. However, in one or more embodiments, the various actions may be performed by alternate components to those described.

The flowchart 400 begins at 402, and the authentication interface 320 receives a request to assign a single sign-on configuration for a user profile. According to one or more embodiments, the request may be transmitted on to authentication setup module 341. For example, the authentication interface 320 may be a web-based interface that allows the administrator to interface with the authentication setup module 341 of developmental platform server instance 114. At 404, the authentication interface 320 may present a user interface with input fields for configuration characteristics. The fields may be directed to various requirements for the single sign-on configuration. In one or more embodiments, the single sign-on configuration may be a SAML configuration. The fields may include any type of field, such as a text box, a drop-down menu, radio button selection items, and the like. According to one or more embodiments, the input fields request information about the single sign-on configuration for the profile such as identifying information about the profile, as well as identifying information about an identity provider, certificates, and the like.

The flowchart 400 continues at 406, and an indication is received that the fields are complete. The indication may be submitted by the administrator and indicate that the administrator believes the fields are complete. According to one or more embodiments, the indication may indicate an initial request to activate the configuration, but further actions must be taken. Thus, an administrator may not be able to directly activate the configuration for the user profile, as a test connection may be mandated.

At 408, the configuration information as completed by the administrator is stored in a temporary storage location. According to one or more embodiments, the temporary storage location may be any portion of memory, such as ROM or RAM, which is utilized by a testing environment 330. In one or more embodiments, the temporary storage location may be a same storage location the configuration characteristics are stored during the test connection, but are not activated for use by the user until the test connection is successful and the configuration characteristics are activated. Further, in one or more embodiments, a certificate may be provided as part of the configuration request 316, and may be stored in the temporary storage location, or in the certificate store 337, along with information about the certificate, such as an issuer of the certificate. In one or more embodiments, the temporary storage may be used when changes are made to an already active configuration, such as a pre-existing user profile, such that the user may use the pre-existing profile while the new configuration characteristics are set up by an administrator. In one or more embodiments, the testing environment 330 may include a data structure, such as a database or other structure, that stores historic records of configuration characteristics entered by an administrator. Thus, an administrator could leave a partial configuration and return to it later, instead of starting from the beginning if he or she is interrupted. The data structure also allows an administrator to return to previous configuration attempts in order to facilitate setting up a new configuration profile for a user. According to one or more embodiments, the incomplete configuration characteristics may be stored in an alternate location, such as a more permanent storage location, which may facilitate the administrator returning to complete incomplete configuration profiles at a later time.

The flowchart 400 continues at 410, where the authentication setup module 341 performs a test connection using the completed configuration. In one or more embodiments, the test connection may utilize a testing environment 330 to determine whether the user profile for which the configuration characteristics correspond could successfully log into a system or resource utilizing the single sign-on configuration as provided. According to one or more embodiments, the testing environment allow an administrator to test a user profile without changing the user profile. Said another way, the user may still use a previously existing single sign-on profile during the testing process without interruption, as the new configuration received at 402 will not be activated until a test connection is successful.

At 412 a determination is made regarding whether the test connection is successful. In one or more embodiments, the authentication setup module 341 may generate a results page or other data regarding the results from the test connection. In one or more embodiments, the results page may include one or more of the configuration characteristics utilized for the test connection and an indication as to whether particular characteristics worked successfully. Thus, in one or more embodiments, by viewing the results page, an administrator may determine if the test connection was successful, and if not, particular configuration characteristics that caused the test connection to fail. Thus, at 412, if it is determined that the test connection was not successful, then the flowchart 400 continues at 404, and the administrator is again presented with the user interface with the input fields so that the administrator may fix any errors or problematic entries. In one or more embodiments, the results may be shown within the user interface such that the administrator can quickly identify errors in the configuration.

Returning to 412, if it is determined that the test connection is successful, then the flowchart 400 continues at 414, where the administrator is prompted to activate the single sign-on communication for the configuration. In one or more embodiments, the prompt may be presented along with the test connection results page, which may indicate that the test connection was successful. In response to receiving a confirmation from the administrator that the single sign-on communication for the configuration should be activated, the flowchart 400 concludes at 416 where the configuration is stored such that it may be utilized by the user. That is, until now, the user utilizing a single sign-on profile may be using an outdated profile.

Figure 5:
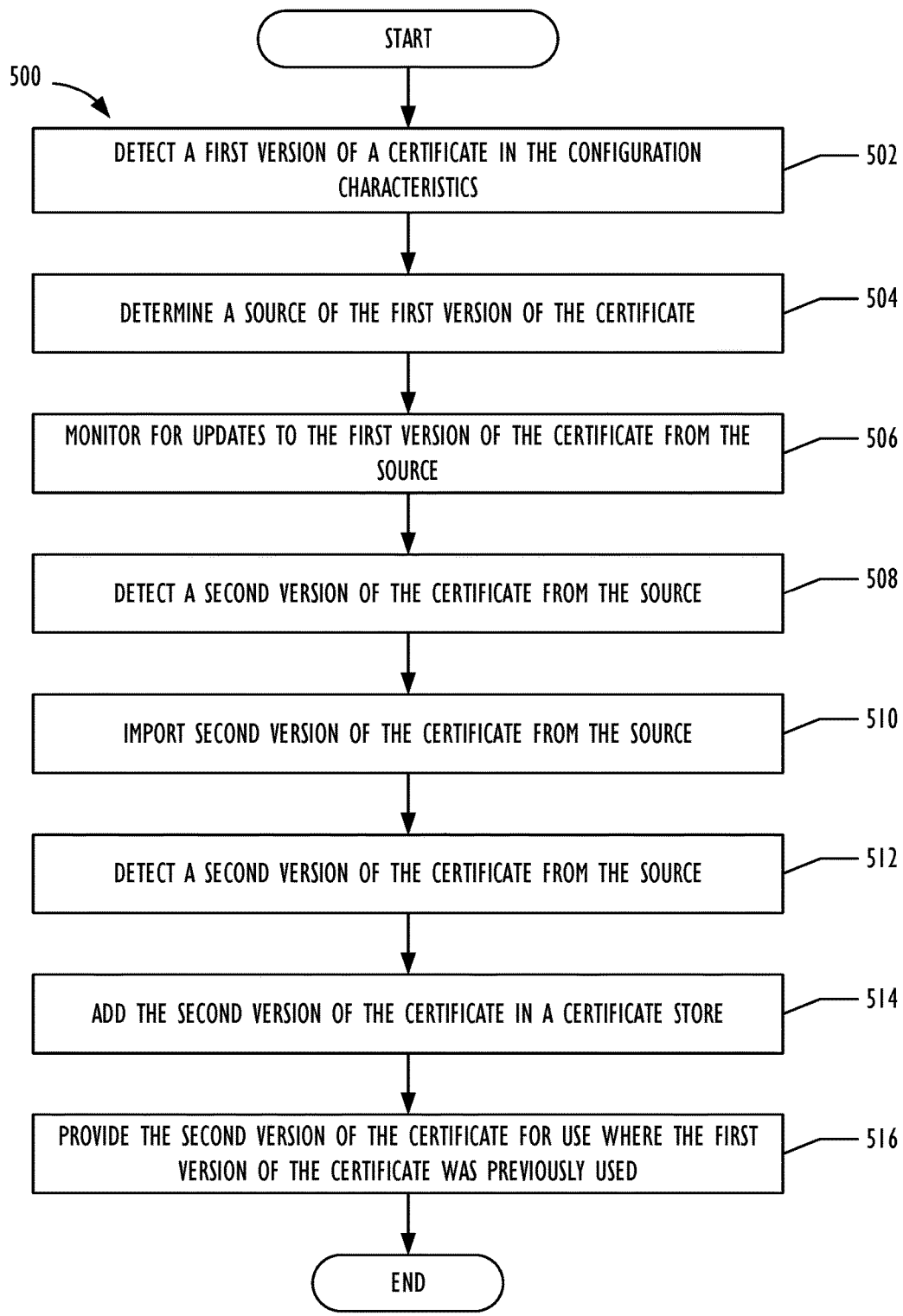
FIG. 5 illustrates a flowchart 500 of an embodiment for automatically retrieving updated certificate information, according to one or more disclosed embodiments.

FIG. 5 illustrates a flowchart 500 of an embodiment for automatically retrieving updated certificate information, according to one or more disclosed embodiments. In one or more embodiments, the authentication setup module 341 or other module such as the authentication management module 345 may monitor sources of licenses utilized by authentication profiles managed by the authentication management module 345. In one or more embodiments, issuers of certificates, such as single sign-on server 350, may publicize updates to their certificates. Thus, in one or more embodiments, the authentication management module 345 may dynamically update user profile being managed with an updated certificate when one becomes available, thus preventing interruptions in a user's access to single sign-on resources when updates to certificates are issued.

The flowchart 500 begins at 502, and the authentication setup module 341 or authentication management module 345 detects a first version of a certificate in the configuration characteristics. In one or more embodiments, the first version of the certificate may be received from the authentication interface 320 at the direction of an administrator. According to one or more embodiments, the certificate may be a SAML certificate. The first version of the certificate may be stored, for example, in certificate store 337. At 504, the authentication management module 345 may identify a source of the first version of the certificate. The certificate may originate from an identity provider or other issuer. The source may be identified based on the certificate, or based on the configuration characteristics submitted by the administrator. According to one or more embodiments, information regarding the source may be stored with the certificate in the certificate store 337.

The flowchart 500 continues at 506, and the authentication management module monitors an issuer for updates to certificates stored in certificate store 337, or certificates that are otherwise in use by profiles managed by authentication management module 345. According to one or more embodiments, the authentication management module 345 may occasionally or periodically communicate with the single sign-on server 350 or other issuer to ensure that the certificate store 337 includes the most recent version of the certificate. In one or more embodiments, the authentication management module may subscribe to the single sign-on server 350 to receive notifications of updates to certificates in certificate store 337. At 508, a second version of the certificate from 502 is detected as available in the certificate store 337.

At 510 the authentication management module 345 imports the second version of the certificate from the source, such as single sign-on server 350. In one or more embodiments, the second version may be added to the certificate store 337. According to one or more embodiments, the second version of the certificate may be linked to the first version such that each configuration profile that utilizes the certificate will be aware of the first version as well as the second version of the certificate such that single sign-on activities may be attempted using both certificates. According to one or more embodiments, the second version of the certificate may replace the first version of the certificate in the certificate store 337. The flowchart concludes at 516, when the second version of the certificate is provided for user where the first version of the certificate was previously used. In one or more embodiments, the configuration profiles that utilize the certificate may be updated to utilize the second version of the certificate. Thus, according to one or more embodiments, user profiles that utilize the certificate may continue to work without interruption when the certificate is updated.

It should be understood that the various actions described above with respect to flowchart 400 and flowchart 500 may be performed in alternate combinations or orders. Further, according to one or more embodiments, two or more of the various actions may be performed in parallel. Further, not all of the actions may be required, according to one or more embodiments.

Figure 6:
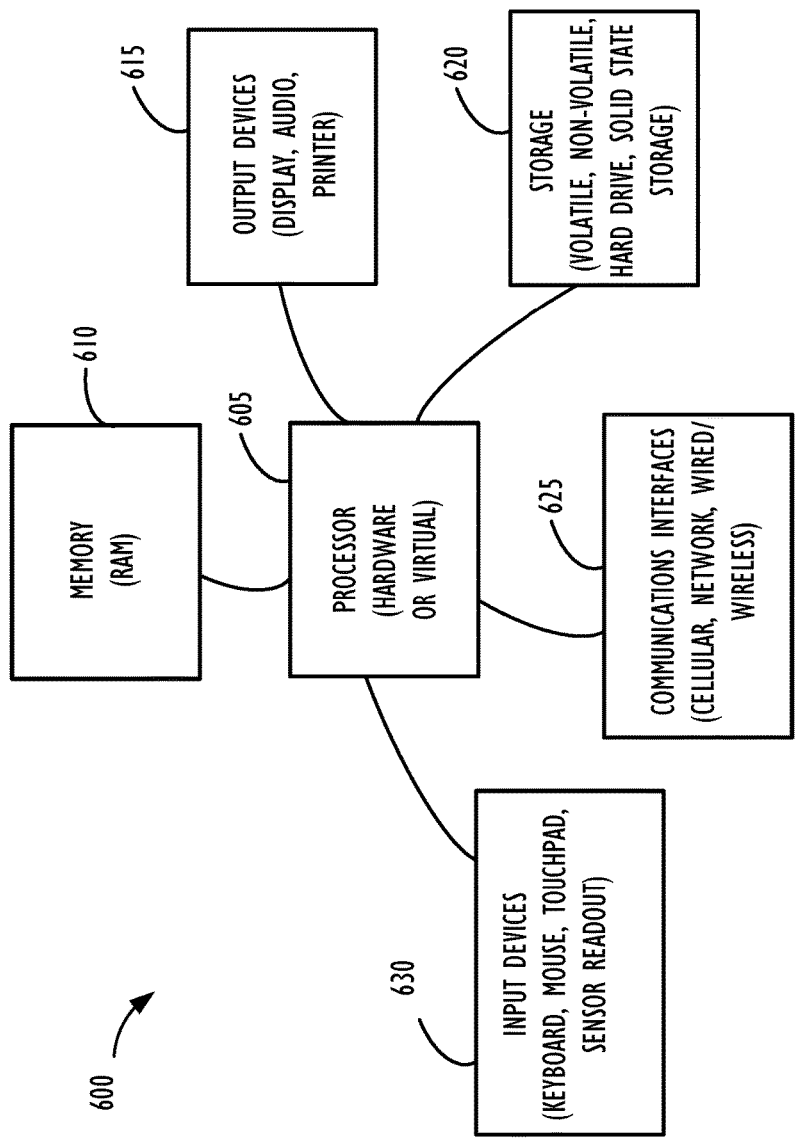
FIG. 6 illustrates a high-level block diagram 600 of a processing device (computing system) that may be used to implement one or more disclosed embodiments.

FIG. 6 illustrates a high-level block diagram 600 of a processing device (computing system) that may be used to implement one or more disclosed embodiments (e.g., service provider cloud infrastructure 305, client devices 104A-

104E, server instances 112, data centers 206A-B, etc.). For example, computing device 600 illustrated in FIG. 6 could represent a client device or a physical server device and include either hardware or virtual processor(s) depending on the level of abstraction of the computing device. In some instances (without abstraction) computing device 600 and its elements as shown in FIG. 6 each relate to physical hardware and in some instances one, more, or all of the elements could be implemented using emulators or virtual machines as levels of abstraction. In any case, no matter how many levels of abstraction away from the physical hardware, computing device 600 at its lowest level may be implemented on physical hardware. As also shown in FIG. 6, computing device 600 may include one or more input devices 630, such as a keyboard, mouse, touchpad, or sensor readout (e.g., biometric scanner) and one or more output devices 615, such as displays, speakers for audio, or printers. Some devices may be configured as input/output devices also (e.g., a network interface or touchscreen display). Computing device 600 may also include communications interfaces 625, such as a network communication unit that could include a wired communication component and/or a wireless communications component, which may be communicatively coupled to processing element 605. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 6, processing device 600 includes a processing element such as processor 605 that contains one or more hardware processors, where each hardware processor may have a single or multiple processor cores. In one embodiment, the processor 605 may include at least one shared cache that stores data (e.g., computing instructions) that are utilized by one or more other components of processor 605. For example, the shared cache may be a locally cached data stored in a memory for faster access by components of the processing elements that make up processor 605. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 6, the processing elements that make up processor 605 may also include one or more other types of hardware processing components, such as graphics processing units (GPU), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory medium configured to store various types of data. For example, memory 610 may include one or more storage devices 620 that comprise a non-volatile storage device and/or volatile memory. Volatile memory, such as random access memory (RAM), can be any suitable non-permanent storage device. The non-volatile storage devices 620 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 620 may be used to store overflow data if allocated RAM is not large enough to hold all working data. The non-volatile storage devices 620 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600.

A user interface (e.g., output devices 615 and input devices 630) can include a display, positional input device (such as a mouse, touchpad, touchscreen, or the like), keyboard, or other forms of user input and output devices. The user interface components may be communicatively coupled to processor 605. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 600 may comprise other components well known in the art, such as sensors, powers sources, and/or analog-to-digital converters, not explicitly shown in FIG. 6.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A method for improving a security configuration, comprising:
   receiving a request to assign a new single sign-on configuration for an existing user profile;
   presenting a user interface comprising one or more input fields for single sign-on configuration characteristics associated with the existing user profile;
   receiving an indication of the single sign-on configuration characteristics from the user interface, wherein the single sign-on configuration characteristics are stored in a temporary storage location and in a testing environment, and wherein the temporary storage location is associated with the testing environment;
   in response to receiving the indication, performing a test connection using the single sign-on configuration characteristics;
   in response to determining that the test connection did not succeed, providing a results page, wherein the results page identifies at least one of the single sign-on configuration characteristics causing an error;
   in response to determining that the test connection succeeded, providing a prompt, via the user interface, to activate the single sign-on configuration characteristics for the existing user profile; and
   in response to receiving an activation confirmation, storing the single sign-on configuration characteristics in a permanent storage location and activating the single sign-on configuration characteristics for the existing user profile.

2. The method of claim 1, comprising:
   performing ongoing monitoring of an identity provider to detect updated digital certificates;
   receiving, from the identity provider, an updated certificate; and
   dynamically updating a digital certificate in the existing user profile.

3. The method of claim 2, further comprising:
   adding the updated digital certificate to a certificate store.

4. The method of claim 1, wherein the new single sign-on configuration comprises a security assertion markup language (SAML) configuration.

5. The method of claim 1, wherein the existing user profile remains active using existing single sign-on configuration characteristics during the test connection.

6. A non-transitory computer readable medium comprising computer readable code for improving security configurations, executable by one or more processors to:
   receive a request to assign a new single sign-on configuration for an existing user profile;
   present a user interface comprising one or more input fields for single sign-on configuration characteristics associated with the existing user profile;
   receive an indication of the single sign-on configuration characteristics from the user interface, wherein the single sign-on configuration characteristics are stored in a temporary storage location and in a testing environment, and wherein the temporary storage location is associated with the testing environment;
   in response to receiving the indication, perform a test connection using the single sign-on configuration characteristics;
   in response to determining that the test connection did not succeed, provide a results page, wherein the results page identifies at least one of the single sign-on configuration characteristics causing an error;
   in response to determining that the test connection succeeded, provide a prompt, via the user interface, to activate the single sign-on configuration characteristics for the existing user profile; and
   in response to receiving an activation confirmation, store the single sign-on configuration characteristics in a permanent storage location and activate the single sign-on configuration characteristics for the existing user profile.

7. The non-transitory computer readable medium of claim 6, comprising computer readable code to:
   perform ongoing monitoring of an identity provider to detect updated digital certificates;
   receive, from the identity provider, an updated certificate; and
   dynamically update a digital certificate in the existing user profile.

8. The non-transitory computer readable medium of claim 7, comprising computer readable code to:
   add the updated digital certificate to a certificate store.

9. The non-transitory computer readable medium of claim 6, wherein the new single sign-on configuration comprises a security assertion markup language (SAML) configuration.

10. The non-transitory computer readable medium of claim 6, wherein the existing user profile remains active using existing single sign-on configuration characteristics during the test connection.

11. A system for improving security configurations, comprising:
    a memory; and
    one or more hardware processors configured to execute instructions stored in the memory to cause the system to:
       receive a request to assign a new single sign-on configuration for an existing user profile;
       present a user interface comprising one or more input fields for single sign-on configuration characteristics associated with the existing user profile;
       receive an indication of the single sign-on configuration characteristics from the user interface, wherein the single sign-on configuration characteristics are stored in a temporary storage location and in a testing environment, and wherein the temporary storage location is associated with the testing environment;
       in response to receiving the indication, perform a test connection using the single sign-on configuration characteristics;
       in response to determining that the test connection did not succeed, providing a results page, wherein the results page identifies at least one of the single sign-on configuration characteristics causing an error;

in response to determining that the test connection succeeded, provide a prompt, via the user interface, to activate the single sign-on configuration characteristics for the existing user profile; and in response to receiving an activation configuration, store the single sign-on configuration characteristics in a permanent storage location and activate the single sign-on configuration characteristics for the existing user profile.

12. The system of claim 11, comprising computer readable code to:

perform ongoing monitoring of an identity provider to detect updated digital certificates;

receive, from the identity provider, an updated certificate; and dynamically update a digital certificate in the existing user profile.

13. The system of claim 11, wherein the new single sign-on configuration comprises a security assertion markup language (SAML) configuration.

14. The system of claim 11, wherein the existing user profile remains active using existing single sign-on configuration characteristics during the test connection.

* * * * *